United States Patent [19]
Parsons et al.

[11] 3,868,566
[45] Feb. 25, 1975

[54] SYSTEM FOR MONITORING CHASSIS POTENTIAL RELATIVE TO A REFERENCE

[75] Inventors: Charles Henry Parsons, Monroe; Jay Richard Feldman, Fairfield, both of Conn.

[73] Assignee: General Signal Corporation, Rochester, N.Y.

[22] Filed: Apr. 2, 1973

[21] Appl. No.: 347,319

[52] U.S. Cl. .................................. 324/51, 324/72
[51] Int. Cl. ........................................... G01r 31/02
[58] Field of Search ............ 324/51, 52, 53, 72, 54, 324/133; 317/18 B, 18 D, 18 C; 340/255

[56] References Cited
UNITED STATES PATENTS

| | | | |
|---|---|---|---|
| 2,469,703 | 5/1949 | Simkins | 324/51 |
| 2,620,379 | 12/1952 | Zimmerman | 324/53 |
| 2,645,754 | 7/1953 | Pitinsky | 324/51 |
| 2,832,069 | 4/1958 | Doyle | 324/51 UX |
| 2,862,179 | 11/1958 | Murphy | 324/51 |
| 2,895,106 | 7/1959 | Taunt | 324/51 X |
| 3,320,524 | 5/1967 | Miller | 324/54 |
| 3,581,152 | 5/1971 | Hunt | 340/255 X |
| 3,676,739 | 7/1972 | Neuhouser | 317/18 C |
| 3,783,340 | 1/1974 | Becker | 324/51 X |

FOREIGN PATENTS OR APPLICATIONS

| | | | |
|---|---|---|---|
| 427,183 | 4/1935 | Great Britain | 317/18 A |
| 662,878 | 12/1951 | Great Britain | 317/18 B |
| 794,106 | 4/1958 | Great Britain | 317/18 B |
| 178,668 | 10/1935 | Switzerland | 317/18 B |

*Primary Examiner*—Gerard R. Strecker
*Attorney, Agent, or Firm*—Milton E. Kleinman; George W. Killian

[57] ABSTRACT

A system and structure is shown for detecting and responding to differences in potential which may exist between a reference potential which will be referred to herein as reference ground and one or more of a plurality of other metallic objects. A pair of grounding conductors is used for each object and an indication is obtained if the difference of potential between the end point of the two grounding conductors connected to the chassis of the associated object, and the reference ground, exceeds a predetermined value. An indication is also provided if the loop formed by the two grounding conductors and the chassis exceed a predetermined resistance value. The indication of the difference of potential is an indication of the potential difference between the various metallic objects, or chassis, in the system. The measurement of the loop resistance value is a measurement of the ground wire integrity and assures that the requisite low resistance exists for accurate potential difference measurements. Working in combination the measurement provides an indication of whether or not the environment is an equipotential environment and/or the difference in potential between any particular object and the reference ground.

1 Claim, 1 Drawing Figure

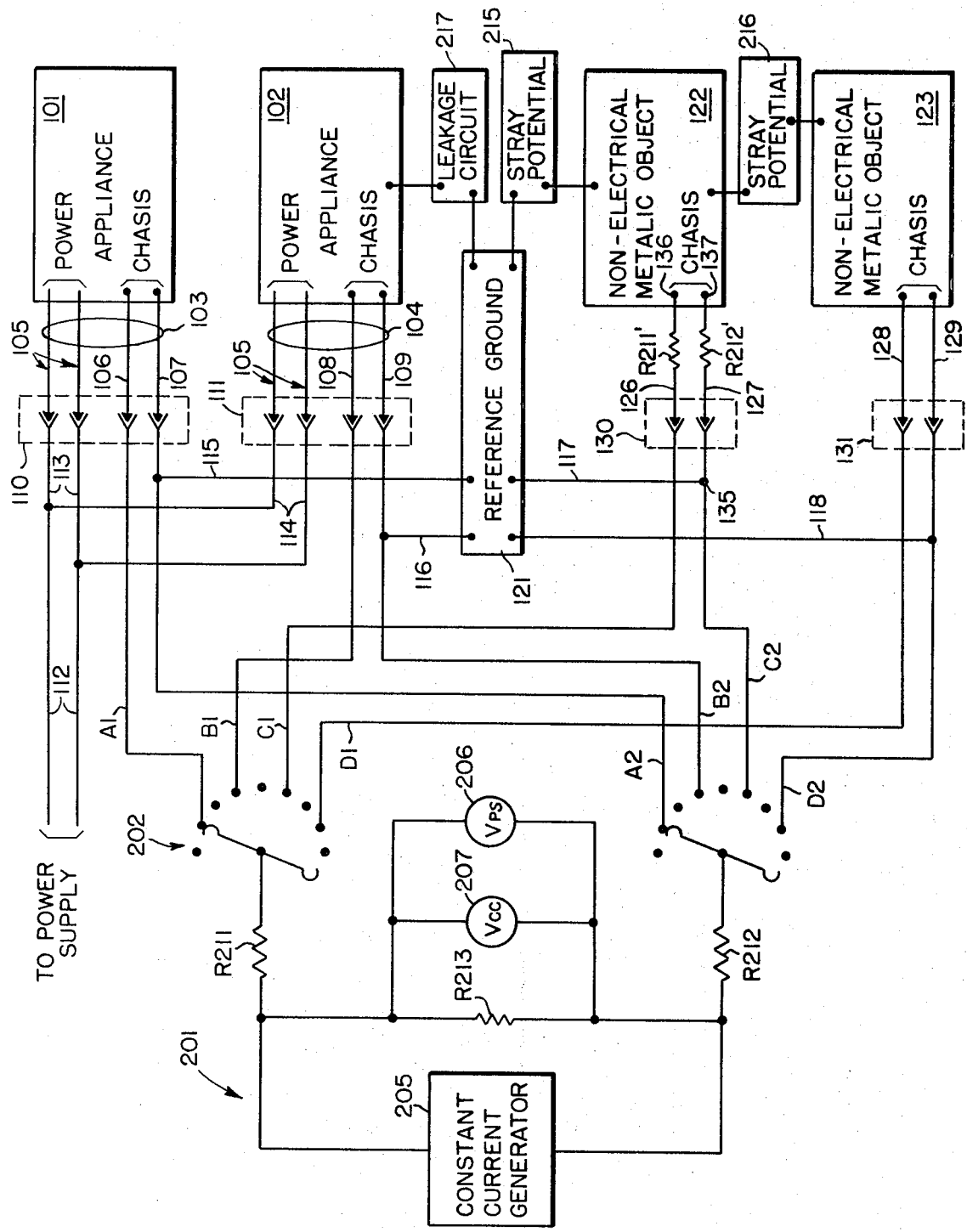

SYSTEM FOR MONITORING CHASSIS POTENTIAL RELATIVE TO A REFERENCE

BACKGROUND OF THE INVENTION

In any area where electrical equipment and metallic objects are used it is normal for a small potential difference to exist between the chassis of various pieces of electrical equipment and/or other metal objects. Normally the potential differences between such electrical equipment and metallic objects are below the threshold of perception and go unnoticed by persons coming in contact with such metallic objects and equipment. In recent years it has become conventional for most electrical systems and electrical equipment to include a grounding wire which is incorporated into the power cord of electrical equipment and carries leakage currents to ground. This system prevents the chassis of such electrical equipment rising to a potential which will be dangerous under normal circumstances. However, even when such grounding power cord is employed a potential will exist, at the chassis of the equipment, which is dependent upon the current in the grounding cord multiplied by the resistance of the grounding path to ground. In addition, stray currents can also occur in the metallic structure of a building and thereby cause different potentials to exist at different areas. However, as indicated, under normal conditions these potentials are below the threshold of perception.

An improperly designed grounding system may create a shock hazard. The degree of hazard depends not only on the voltage but also on a wide variety of other conditions. For example, a condition which would be considered exceptionally safe in a home environment could be dangerous in a hospital environment. In modern hospitals a wide variety of electrical devices may be used in connection with the care of a patient and such devices may be connected directly to the patient. Under such conditions even low level stray potentials or currents could become dangerous.

Great ingenuity has gone into designing systems which will protect the patient by guarding against leakage currents and stray potentials. Widely used techniques include isolated power systems, doubly insulated apparatus and careful grounding of the metal portion of any and all apparatus which may be used in such environment to provide equipotential systems.

To provide for patient safety a code has been developed and introduced which requires an equipotential environment for patients whose treatment makes them particularly susceptible to shock hazards. For example, Section 517-51 of the 1971 National Electric Code requires that the difference of potential in the vicinity of such patients must not exceed 5 millivolts across 500 ohms.

Systems have been proposed which require the addition of a second grounding wire for each piece of apparatus. A continuity monitor has also been proposed to determine if the two grounding wires are intact. If there is any discontinuity in either grounding wire the continuity monitor would activate an alarm. Such a system is described in the NFPA Pamphlet No. 76 BM 1971, page 54. This system, however, does not measure the difference of potential from one chassis to another and although the leakage currents are reduced by the isolation transformer no indication is given of difference of potential arising from power sources outside the system described.

SUMMARY OF THE INVENTION

The present invention relates to a method of determining the difference of potential between various metal objects in a given area and providing an alarm if predetermined voltage potentials are exceeded. The invention discloses a method for providing and monitoring an equipotential environment. It can be used in an isolated system, a conventional power system or in a non-electrical system. The system can evaluate each individual piece of equipment independently thereby allowing the connection of more equipment than may be used with presently available systems. The system will detect ground currents and differences of potential even when such currents or potential are caused by external power sources.

In summary, it is an object of the invention to provide an equipotential monitor.

It is a more specific object of the invention to monitor a system which should be maintained in an equipotential state and to provide an alarm if there is a deviation exceeding a predetermined value.

It is another object of the invention to monitor the potential of the chassis of a plurality of objects relative to a reference ground by employing two ground leads between the monitor and the chassis of the equipment, or metal objects, to be monitored.

It is an even more specific object of the invention to measure the voltage difference which may exist between the two grounding leads at the monitor as a result of stray currents flowing in the grounding leads.

It is another object of the invention to provide an alarm signal in the event that the aforementioned voltage difference exceeds a predetermined maximum.

It is another object of the invention to monitor the resistance of the two ground leads as a measure of the accuracy of the potential difference measurement.

It is another object of the invention to provide an alarm signal if the resistance of the ground wires exceeds a predetermined value.

It is another object of the invention to provide a means for evaluating the status of each piece of equipment independently.

It is another object of the invention to detect ground currents and differences of potential even if such deviations are caused by external power sources.

BRIEF DESCRIPTION OF THE DRAWING

The invention is disclosed in a drawing comprising a single FIGURE using conventional symbols for various components of the system. Details which are not necessary for an understanding of the invention have been omitted and block diagrams have been used in the drawing, where practical, in order to more clearly disclose the novel features and aspects of a system incorporating the invention. The drawing discloses one form of the invention and is not meant in any way to limit its scope. It is rather so drawn as to aid in an understanding of the invention.

DESCRIPTION OF THE PREFERRED EMBODIMENT

The invention will find particular utility in a system wherein it is desired to be able to monitor the potential difference between a wide variety of electrical appliances and/or other devices of a non-electrical nature but having metallic or conducting components. A system incorporating the present invention might be used in a hospital, electrical laboratory or any other location wherein it is desirable to maintain an equipotential environment. The invention, as disclosed, is designed to comply with Section 517-51 of the 1971 National Electric Code. Modification could readily be made, by those skilled in the art, to make the system test for and provide alarms in response to other predetermined potential differences.

In the following description appliance cords having four conductors are described. Obviously such cords may comprise a four conductor cable or a combination of one, two or three conductor cables as may be most convenient and expedient.

Considering now more specifically the drawing; there will be seen therein appliances 101 and 102 which are coupled to the power supply and the monitoring system by appliance cords 103 and 104, respectively. Each of the appliance cords 103 and 104 comprise four separate conductors including the power conductors 105 and the grounding conductors 106 and 107 for appliance 101 and grounding conductors 108 and 109 for appliance 102. The four conductors for appliance cord associated with appliance 101 may terminate at a plug which may be plugged into a receptacle. The plug and receptacle for appliance 101 are schematically indicated by the box 110. In a similar manner the appliance 102 has its appliance cord 104 coupled to a plug which may be plugged into a receptacle. The plug and receptacle for appliance 102 are represented by the box 111. As may be seen the power conductors 105 are coupled from the plug and receptacle 110 or 111 to the power supply on the pair of wires 112. The power supply wires 112 may be connected to any appropriate type of power supply, such as a commercial power supply, either AC or DC, or an isolated power supply of an appropriate potential and frequency. It will be readily understood that the plug and receptacle combinations 110 and 111 may be polarized so that the plugs cannot be inserted in such manner as to couple one of the grounding conductors 106 to 109 to the power supply leads 112. Furthermore, if the appliances 101 and 102 should happen to require different potentials, it would be well known to provide plugs and receptacles 110 and 111 which do not match each other and so that one plug cannot be plugged into the wrong receptacle. In such case the power supply leads 113 and 114 would be connected to individual power supplies rather than to the supply leads 112.

The grounding conductors 106 and 107 from appliance 101 will be coupled via the plug and receptacle 110 to the leads designated A1 and A2. In a similar manner the grounding conductors 108 and 109 associated with appliance 102 will be coupled via the plug and receptacle 111 to the leads designated B1 and B2. The grounding leads 106 to 109, inclusive, are independently and securely connected, by an electrical bonding means, to the metal frame or chassis of their respective appliances. In addition, as may be seen, the leads A2 and B2 are connected by reference conductors 115 and 116 to the reference ground 121. Accordingly, there is a complete electrical path from the chassis of appliance 101 through grounding conductor 107 and the plug and receptacle 110 to the reference conductor 115 and the reference ground 121. Similarly, there is a complete electrical conduction path from the chassis of appliance 102 through the grounding conductor 109 and the plug and receptacle 111 to the reference conductor 116 and the reference ground 121. If the conduction paths just traced had zero resistance there could be no potential difference between the chassis of appliance 101 and the reference ground 121 or between the chassis of appliance 102 and the reference ground 121. And, therefore, there could be no potential difference between the chassis of appliances 101 and 102. However, such conduction paths cannot be reduced to a zero resistance and therefore it is possible for there to be a difference between the potential of the chassis of appliance 102 and the potential of the chassis of appliance 101. However, the difference in frame potential between the two appliances cannot exceed the sum of the magnitude of the potential difference from appliance 101 to the reference ground 121 and the potential difference from appliance 102 to the reference ground 121.

From the drawing it will be seen that the metallic surfaces, or chassis, of any non-electrical metallic objects such as 122 or 123 will be coupled to the reference ground 121 in a similar manner. That is, although the objects 122 and 123 are not electrically actuated devices they still have appropriate grounding conductors such as conductors 126 and 127 for object 122 or 128 and 129 for object 123. An appropriate plug and receptacle 130 is used to connect the grounding conductors 126 and 127 to the leads designated C1 and C2, respectively. In a similar manner the plug and the receptacle 131 coupled the ground conductors 128 and 129 to the leads designated D1 and D2, respectively. The objects 122 and 123 may comprise any of a wide variety of objects which include a metal frame or chassis.

As may be seen in the drawing, there is a complete and direct electrical connection from the chassis of each appliance and/or non-electrical metallic object to the reference ground 121. Notwithstanding these direct electrical connections from each appliance or object to the reference ground 121 situations and occasions will arise when there are other connections from the chassis of one of the appliances or objects to the chassis of some other appliance or object. The three most common ways by which the chassis may be coupled together are:

1. by direct metal contact;
2. by capacitive coupling to a dielectric; and
3. through the body of some individual touching both objects.

Considering now more specifically the structure shown at the left-hand side of the drawing, it will be seen that it comprises a structure which may be selectively coupled to any one of the pair of wires such as A1, A2; B1, B2; C1, C2; etc. For the purposes of illustration the checking circuit 201 may be selectively coupled to one of the pair of named wires by means of a mechanical stepping switch 202. However, if desired an individual checking circuit 201 could be provided for each of the pairs of wires A1, A2, etc.; or more sophisticated scanning equipment could be used. Since the particular coupling or scanning equipment used does not form an integral part of this invention, a simple stepping switch 202 is shown in order to illustrate the coupling, or scanning principle.

For the present discussion it will be assumed that the scanner (not shown) or the stepping switch 202 is at the position shown and that the checking circuit is coupled to the wire pairs A1, A2 and then via the grounding conductors 106 and 107 to the appliance 101. The checking circuit 201 includes a constant current generator 205, and first and second voltage sensitive devices 206 and 207.

The conductors 106 and 107 for appliance 101, and the corresponding conductors for any other appliance or object are made sufficiently large to have a relatively low resistance and are not any longer than may be required for convenience and safety.

In a similar manner the conductors A1, A2; B1, B2; etc. have similar characteristics and requirements. Accordingly, the total resistance of the wires 106, 107 and their corresponding portions A1, A2 is relatively low. The total resistance of each conducting path should be only a fraction of the value of the resistor R213. The resistors designated R211 and R212 are not physical resistors but represent the distributed resistance of the wires 106, 107 etc., as the case may be. That is, when the stepping switch 202 is in the position shown, the resistor designated R211 represents the distributed resistance of the path from the stepper switch 202 through lead A1, the plug and receptacle 110 and lead 106 to the appliance 101. When the stepper switch 202 is in the position to contact lead B1 the resistor R211 represents the distributed resistance of the lead B1, the plug and receptacle 111 and the lead 108 to the appliance 102. It is important to bear in mind that the resistors R211 and R212 actually represent distributed resistance. Every wire shown includes some resistance. For wires 126 and 127 a portion of the distributed resistance is shown as R211' and R212', respectively. Typically the resistor R213 may have a value of approximately 1 ohm. The size of the wires 106 to 109 and 126 to 129 etc. should be so selected that the distributed resistance of each is of the order of one-tenth or two-tenths of an ohm or less. Again, the resistors R211 and R212 are not actual resistors but are shown to represent the actual resistance of the wires between the checking circuit 201 and the associated appliance or non-electrical metallic object. As the values of the resistance represented by the resistors R211 and R212 increase with respect to the resistor R213 the accuracy of the difference of potential measurement will be decreased.

Ground Continuity Verification

The checking circuit 201 can check the continuity and the validity of the grounding conductors to any of the appliances 101, 102 or the non-electrical metallic objects such as 122 or 123. The power source for the validity checking circuit 201 is a constant current generator 205. Normally the constant current generator 205 will be selected to have a different frequency from that of the power supplies for the appliances 101 and 102. For instance if the power supply for the appliances is the conventional 60 Hertz, the constant current generator 205 may be a D.C. supply or an A.C. supply having a frequency other than 60 Hertz. This difference in frequency between that of the main power supply to leads 112 and that of the constant current generator 205 permits an alarm caused by an open ground wire to be distinguished from an alarm caused by a difference of potential between a chassis and the reference ground 121. As will be shown hereinbelow this does not mean that a D.C. potential in excess of the alarm point will go undetected. The use of a constant current generator 205 having a frequency which is different from the power frequency avoids ambiguity in a range of possible conditions. The constant current generator 205 is chosen and designed to produce a current such that the voltage drop across the resistor 213 is of a predetermined magnitude when the circuit through the leads A1, A2, and the associated grounding conductors 106, 107 to the appliance 101 is open circuited. Since this potential could appear at the chassis it is kept low relative to the chassis potential which will generate an alarm condition. When the mentioned leads are not open ciruited and there is complete continuity of the grounding circuit the resistor R213 will be shunted and a substantial portion of the current generated by the constant current generator 205 will pass through the leads A1, A2 and the grounding conductors 106 and 107. Accordingly, the voltage drop across the resistor R213, as measured by the voltage sensing device 207, will be very small under normal conditions. That is, the voltage detected by the sensing device 207 will be much smaller when the scanning device 201 is coupled to an appliance, such as 101, having a low resistance grounding circuit, than would be the case when one or more of the grounding leads is open circuited or has a high resistance grounding circuit.

The voltage sensing device 207 is designed and selected to respond to potentials of the same frequency as that produced by the constant current generator 205. As already indicated the voltage sensing device 207 will detect too large a voltage in the event that the grounding circuit is open. However, there is a possibility that a stray potential of the same type (frequency) as the constant current generator may somehow be impressed on the grounding circuit and cause the voltage sensed by the device 207 to be below normal. Accordingly, the sensing device 207, if of the alarm indicating type, should be able to provide an alarm if the voltage deviates more than a predetermined amount in either direction, from the norm.

If the constant current generator 205 generates a D.C. current and there is a stray potential which is inadvertently coupled to the grounding conductors the current through the sensing device 207 could become negative. Under such conditions an alarm should be generated. Further consideration will be given to this matter hereinbelow.

Detection of Potential Difference Between Chassis and Reference Ground

Under ideal circumstances there should be little if any, potential difference between the chassis of an appliance such as 101 or 102 and the reference ground 121; or between the metal surfaces of non-metallic objects such as 122 or 123 and the reference ground 121. However, as a result of certain irregular events or faulty equipment a potential between the reference ground 121 and a chassis or metal object may develop. To measure this difference of potential the voltage sensitive device 206 is provided. The voltage sensing device 206 is designed to reject voltages of the same frequency as the constant current generator 205. The voltage sensing device 206, like the voltage sensing device 207, may comprise a more sophisticated device which provides an alarm in the event that the voltage sensed deviates more than a predetermined amount from a norm.

It should be recalled that it has previously been set forth that the resistance represented by R211 and R212 is appreciably less than that of the resistor R213. In addition, the sum of the resistances R211 and R212 is appreciably less than the value of the resistor R213. This relationship may be seen by comparing the readings of voltage sensitive device 207 when the grounding circuit is open circuited and when it is completed and in parallel with resistor R213.

Consider now a situation wherein a stray potential has been introduced between the reference ground 121 and one of the appliances or a non-electrical metallic object. For this discussion it will be assumed that a stray potential 215 is introduced between the reference ground 121 and the nonelectrical metallic object 122. The grounding conductors 126 and 127 of the object 122 are conducted through plug and receptacle 130 to conductors C1 and C2. For the purposes of this discussion it will now be assumed that the conductors C1 and C2 are coupled to the checking circuits 201 by means of the stepping switch 202 or by means of an alternate scanning system (not shown). The introduction of the stray potential 215 represents an abnormal situation which may occur from a variety of situations such as those set forth hereinabove.

As a result of the stray potential 215 a current will be introduced in the ground conductors 126 and 127. Current will flow from the reference ground 121 to the stray potential circuit 215 to the chassis of the object 122. The current will divide between the grounding conductors 126 and 127. The current which enters lead 127 will pass through the plug and receptacle 130 to the reference conductor 117 and back to the reference ground 121. It should be recalled that the resistance designated R212 represents a distributed resistance and that therefore a portion of this resistance is included in the lead 127; for convenience in visualizing this and analyzing the circuit a resistor R212' is shown in lead 127. If the resistance R212' is construed to represent only the resistance of lead 127 it will be seen that the total resistance represented by resistor R212' is less than the total resistance represented by resistor R212. And as a matter of fact, the resistor R212', representing the distributed resistance of lead 127 comprises the major portion of the distributed resistance in leads 127 and C2. That is, R212' is nearly equal to R212 and therefore, as a first approximation, the resistance of the C2 lead (the difference of R212 and R212') may be ignored. In a similar manner R211' is nearly equal to R211. Accordingly the current which enters the ground conductor 126 passes through resistor R211' and through the plug and receptacle 130 to lead C1 and through the stepper switch 202, resistor R213, lead C2 and grounding lead 117 to the reference ground 121. Since R211 and R212 and their respective components R211' and R212' are all relatively low resistances as has already been mentioned, the majority of the current from the stray potential 215 will flow through the path including leads 127 and 117 directly to the reference ground 121 inasmuch as this is the path of least resistance. A substantially lesser current will flow through leads 126, C1 and the series combination of the resistors R211, R213 and the applicable portion of the distributed resistance represented by R212 and leads C2 and 117 to the reference ground 121. Furthermore, since the resistance R211', which comprises most of the value of R211, is much less than the resistance R213 the voltage across resistor R213 will be approximately equal to the sum of the voltages across R213 and the voltage across the distributed resistance represented by R211'. Since the voltage across resistor R212' is equal to the sum of the voltages across R213 and R211' the voltage across R213 will also be nearly equal to the voltage across R212'. Since the voltage across R212' is the difference of potential between the chassis 122 and the reference ground 121 the voltage across resistor R213 will also be nearly equal to the voltage from the chassis 122 to the reference ground 121. Thus, the voltage measurement across R213 is nearly equal to the stray potential voltage 215.

Accordingly, by measuring the potential across the resistor R213 for each position of the stepping switch 202 it is possible to determine very nearly the potential of each chassis relative to the reference ground 121 and determine if the potential of each chassis is within the allowable range. Also, from these measurements it is possible to predict that the voltage difference between any two chassis is lower than twice the predetermined level.

In addition to the possibility of a stray potential 215 coupling the reference ground 121 and an object 122 there is a possibility that two objects might be coupled by a stray potential, for example, stray potential 216. This situation is not significantly different from that described with respect to stray potential 215. In this case a portion of the stray potential 216 appears across the voltage drop in the lead 117 from the reference ground 121 and lead 127 to object 122. The remaining portion of the stray potential 216 appears across the voltage drop in the lead 118 from the reference ground 121 and the lead 129 to object 123. Thus for each object 122 and 123 there is a potential between it and the reference ground 121. Accordingly, a detection can be made of this potential just as it was for the potential developed by stray potential 215.

A leakage circuit 217 can cause a potential to be developed across the distributed resistance of the leads just as for the cases with stray potentials. Accordingly, leakage circuits between objects, or between an object and the reference ground 121 may be detected in the same manner as stray potentials.

In summary, the system of the present invention can provide an alarm in the event that any one of the grounding conductors such as 106 to 109 or 126 to 129 should go open circuited or develop a high enough resistance to degrade the accuracy of the voltage measurements. In addition, the voltage sensitive device 206 can provide an indication of the magnitude of any potential which may exist between the metal frame of an appliance or a non-electrical object and the reference ground 121. Accordingly, the system illustrated and described affords excellent safeguard and security. With the value of R213 equal to approximately 1 ohm and the values of R211 and R212 each less than two-tenths of 1 ohm an alarm point can be set at approximately 2½ millivolts difference in potential between the reference ground 121 and any chassis. The potential difference between any two chassis will then be no greater than 5 millivolts. The constant current generator 205 can generate 1 millivolt or less across the resistor R213 during open circuit conditions.

While there has been shown and described what is considered at present to be the preferred embodiment of the invention, modifications thereto will readily occur to those skilled in the related art. For example the system could be adapted to respond to different limits. It is believed that no further analysis or description is required and that the foregoing so fully reveals the gist of the present invention that those skilled in the applicable art can adapt it to meet their specific requirements. It is not desired, therefore, that the invention be limited to the embodiment shown and described and it is intended to cover in the appended claims all such modifications as fall within the true spirit and scope of the invention.

What is claimed is:

1. A circuit for monitoring a chassis relative to a reference potential comprising in combination;
   a. a reference potential;
   b. a chassis;
   c. a first conductor having distributed resistance coupling said reference potential and said chassis for conducting current in response to a potential difference between said chassis and said reference potential;
   d. a series circuit comprising a second conductor having a distributed resistance comparable to that of said first conductor and an impedance having a resistance at least a few times greater than that of said distributed resistance and with said series circuit in parallel with said first conductor for conducting current in response to a potential difference between said chassis and said reference potential;
   e. first and second frequency sensitive potential detecting means in parallel with said impedance for monitoring the potential across said impedance, said last named potential being a function of the potential between said chassis and said reference potential; and
   f. a power source in parallel with said impedance and having a predetermined frequency, which differs from that of any power supply coupled to any apparatus contained within said chassis, for providing current to said first conductor and said series circuit, and wherein said first and second frequency sensitive potential detecting means respond to, and reject, respectively, signals of said predetermined frequency; whereby any potential to which said potential detecting means responds, may be identified as including, or not including, said predetermined frequency.

* * * * *